(12) United States Patent
Branca et al.

(10) Patent No.: US 7,172,180 B2
(45) Date of Patent: Feb. 6, 2007

(54) METHOD AND DEVICE FOR ABSORBING SHOCKS AND VIBRATIONS PARTICULARLY FOR A BICYCLE

(76) Inventors: Alfonso Branca, Via Duccio di Boninsegna 15, I-20145 Milan (IT); Herbert Engelen, Silcherstrasse 1, D-77815 Buhl (DE)

( * ) Notice: Subject to any disclaimer, the term of this patent is extended or adjusted under 35 U.S.C. 154(b) by 0 days.

(21) Appl. No.: 10/504,013

(22) PCT Filed: Jan. 29, 2003

(86) PCT No.: PCT/EP03/00865

§ 371 (c)(1),
(2), (4) Date: Aug. 6, 2004

(87) PCT Pub. No.: WO03/066418

PCT Pub. Date: Aug. 14, 2003

(65) Prior Publication Data
US 2005/0140074 A1 Jun. 30, 2005

(30) Foreign Application Priority Data
Feb. 8, 2002 (IT) .......................... MI2002A0230

(51) Int. Cl.
*B62J 1/02* (2006.01)
*F16M 13/00* (2006.01)
(52) U.S. Cl. ........................ 267/132; 297/209; 248/600
(58) Field of Classification Search ................ 267/131, 267/132, 134; 280/220; 297/209; 81/22; 248/600
See application file for complete search history.

(56) References Cited

U.S. PATENT DOCUMENTS

| 5,588,343 A | * | 12/1996 | Rust et al. | .................... 81/489 |
| 5,845,364 A | * | 12/1998 | Chen | ........................... 16/436 |
| 6,364,292 B1 | * | 4/2002 | Chen et al. | ................. 267/131 |

FOREIGN PATENT DOCUMENTS

| DE | 380471 | 9/1923 |
| DE | 198 32 305 | 1/2000 |
| FR | 907 819 | 3/1946 |
| FR | 2 722 753 | 1/1996 |
| GB | 276 261 | 8/1927 |
| WO | WO-03057418 A1 * | 7/2003 |

* cited by examiner

Primary Examiner—Melody M. Burch
(74) Attorney, Agent, or Firm—Andrew Wilford

(57) ABSTRACT

The device for absorbing shocks and vibrations particularly for a bicycle comprises at least one shock-absorber element (2) with first means (3) for connection to the frame (4) of said bicycle and second means (5) for connection to the saddle (6) thereof. The shock-absorber element (2) comprises at least one first and one second rod-shaped element (7, 8) with the first ends facing towards the frame (4) rigidly fixed to the first connection means (3) for locking them inside the saddle post (9) of the frame and the second ends facing the saddle rotatably hinged with the second connection means. The procedure for absorbing shocks or vibrations particularly for a bicycle consists of rotate-translating the saddle of the bicycle during the shock and/or vibration acting on its frame keeping the saddle parallel but set bank with respect to its rest position so as to keep its distance from the pedals of the bicycle substantially unchanged.

4 Claims, 3 Drawing Sheets

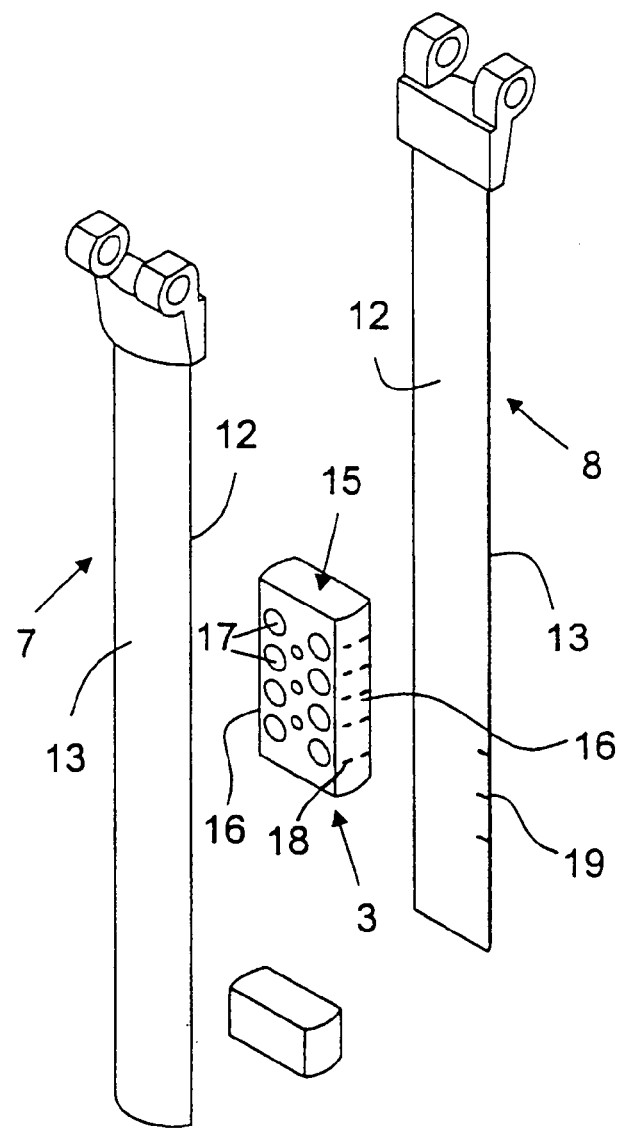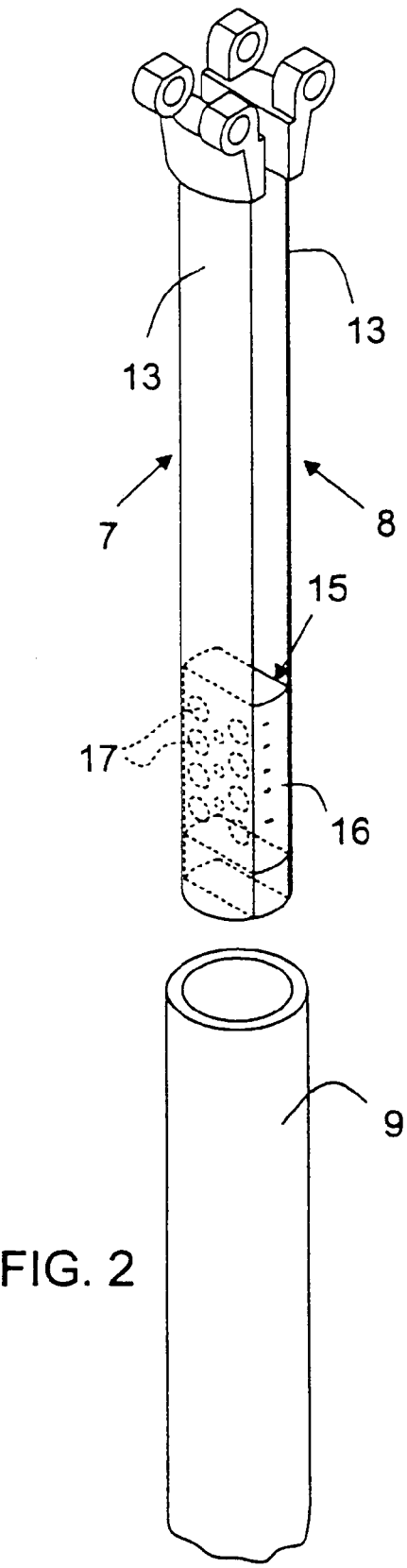
FIG. 1
FIG. 2

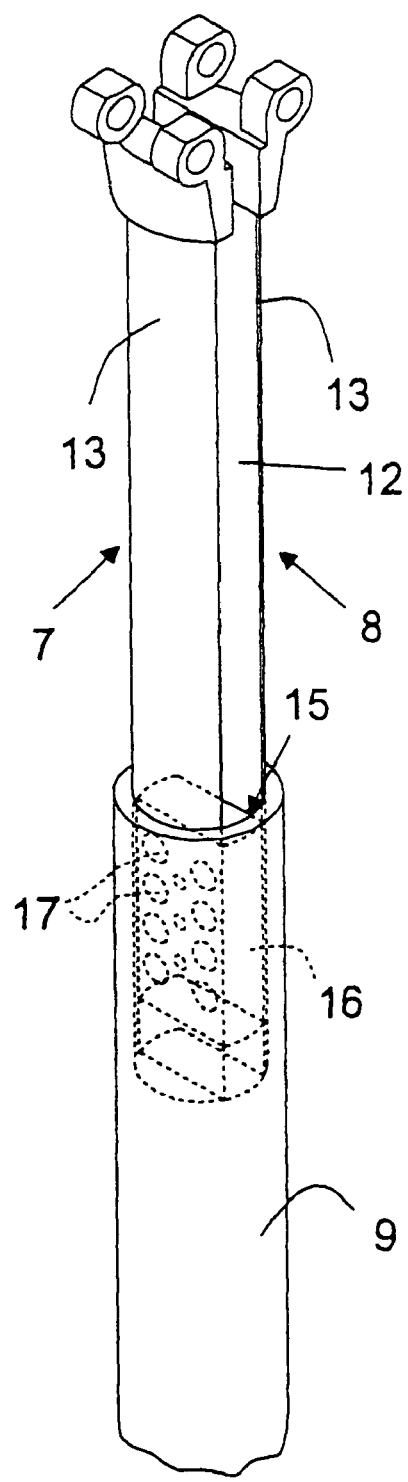
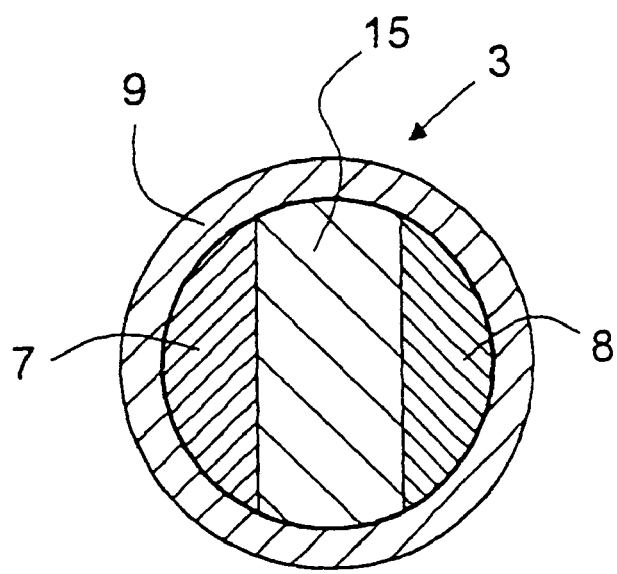
FIG. 5
FIG. 3 ns of the invention are
METHOD AND DEVICE FOR ABSORBING SHOCKS AND VIBRATIONS PARTICULARLY FOR A BICYCLE

CROSS REFERENCE TO RELATED APPLICATIONS

This application is a national stage of PCT/EP03/00865 filed 29 Jan. 2003 and is based upon Italian national application MI2002A000230 of 8 Feb. 2002 under the International Convention.

FIELD OF THE INVENTION

The present invention relates to a device and method for absorbing shocks and vibrations particularly for a bicycle.

BACKGROUND OF THE INVENTION

As is known, in a bicycle the height and the back setting of the saddle are values which are strictly related to each other, to the extent that the modification of one determines a variation of the other.

The height of the saddle is the distance between the center of central movement and the anatomic center of the saddle which is situation 12 centimeters from the rear part of the saddle.

The back setting of the saddle consists of the distance between the vertical from the center of central movement and the saddle.

Such a distance is normally measured with respect to the anatomic center of the saddle (conventionally a point 12 cm from the rear part).

As already pointed out, therefore, these two parameters are strictly correlated: by raising the saddle there is also an increase in the back setting (which can be measured at about 3 millimeters on frames with the shaft at 73° and at about 2.5 millimeters on frames with the shaft at 75°). By lowering the saddle there is a reduction in the back setting (values equal to the previous ones, but negative). By reducing the back setting there is a decrease in the saddle height (about 2.5 millimeters for each centimeter displacement forward). By increasing the back setting of the saddle there is an increase in the saddle height (by about 2.5 millimeters for each centimeter displacement backward).

According to such a strict connection between these two parameters, there can be saddle positions with equal height values but with different back settings, or equal back setting with different heights.

Due to the above, the height and back setting of the saddle must be such as to allow the legs to maximize their drive and recovery potential on the pedal and must allow an effective and synergic intervention of all of the leg muscles.

It is also known to use absorbing devices on a bicycle which can be subdivided into two main groups.

The first group concerns shock-absorber devices made during the production of the bicycle.

Amongst these devices there are, for example, shock-absorbers defined by front and/or rear forks which are telescopic or oscillating.

The second group includes accessory shock-absorber devices, i.e. those devices which can sometimes be applied on a bicycle which has already been finished to improve its performance.

Amongst these devices there are those using springs applied to the saddle or handlebar post.

As is easy to understand, the first group of devices is fixed to the bicycle on which it is made limiting the user's freedom of choice.

Moreover, devices of both the first and second group can be heavy, which is unthinkable for a cyclist, complex and expensive.

Besides these drawbacks which are already harmful in themselves, it should be highlighted that, above all in the case of shock-absorber devices for the saddle which determine a displacement thereof along the axis of the post, the saddle frequently moves towards and away from the center of central movement, with all of the drawbacks described above and which are also unacceptable for any cyclist.

OBJECTS OF THE INVENTION

The object of the present invention is, therefore, to provide a device and method for absorbing shocks and vibrations, particularly for a bicycle, which allows the aforementioned drawbacks of the prior art to be eliminated.

Another object of the invention is to provide a device of this type which takes up little space and which is not very heavy.

Yet another object is to provide a device for the purpose described which does not substantially alter the distance of the saddle from the center of central movement of the bicycle.

A further object of the invention is to provide a device with a degree of shock absorbency which can quickly and simply be adjusted according to the cycling requirements.

Last but not least, it is an object of the invention to provide a device which is substantially cost-effective.

SUMMARY OF THE INVENTION

These and other objects of the present invention are achieved in a device for absorbing shocks and vibrations, particularly for a bicycle, comprising at least one shock-absorber element with first means for connection to the frame of said bicycle and second means for connecting to the saddle thereof. The at least one shock-absorber element comprises at least one first and one second rod-shaped element with the first ends facing towards said frame rigidly fixed to said first connection means for locking them inside the saddle post of said frame and the second ends facing said saddle rotatably hinged with said second connection means.

The present invention also relates to a procedure for absorbing shocks or vibrations particularly for a bicycle, characterized in that it consists of rotate-translating the saddle of said bicycle during the shock and/or vibration acting on its frame keeping said saddle parallel but set back with respect to it rest position so as to keep its distance from the pedals of said bicycle substantially unchanged.

The first and said second rod-shaped elements can be tilted with respect to the vertical.

The first ends can lie on a plane which is substantially tilted and perpendicular to the axis of the post and the second ends can lie on a plane which is substantially horizontal and tilted with respect to the axis of the post and parallel to the seating surface of the saddle.

The second rod-shaped element can extend between the first connection means and the second connection means for a greater length with respect to the first rod-shaped element.

The first and second rod-shaped elements can be made from composite material and can have a predetermined degree of flexibility which is equal to that of the other.

The first and second rod-shaped elements can be made from resin and organic and/or inorganic fiber.

The first and second rod-shaped elements can be made from resin and fiberglass and/or carbon fiber.

The resin can be a thermoplastic resin.

The first and second rod-shaped elements can be made by a pultrusion process.

The first and second rod-shaped elements can have a configuration with in section a flat face and a semicircular face.

The first connection means can comprise a quadrangular plate with its side surfaces having a curvilinear extension suitable for fitting with the semicircular faces of the first and second rod-shaped elements to realize with them a surface with a configuration matching that inside the post.

The plate can have a different length to vary the degree of flexibility of said first and second rod-shaped elements.

The plate can have weight-reducing holes and side notches to be positioned at corresponding notches present on at least one of said first and second rod-shaped elements, the notches indicating the degree of flexibility according to the height and weight of the cyclist.

The second means can have first attachment members to said saddle and second attachment members suitable for allowing a rotate-translation of said saddle during the flexing of the first and second rod-shaped elements.

BRIEF DESCRIPTION OF THE DRAWING

Further characteristics and advantages of the invention shall become clearer from the description of a preferred but not exclusive embodiment of the device and method for absorbing shocks or vibrations, particularly for a bicycle, illustrated in the attached drawings, in which:

FIG. 1 is an exploded perspective view of a device according to the invention;

FIG. 2 is a perspective view of the device of FIG. 1 assembled and aligned with the saddle post of a bicycle;

FIG. 3 is a perspective view of the device of FIG. 1 assembled and inserted into the saddle post of the bicycle;

FIG. 5 is a sectional view of the device at the saddle post of the bicycle.

SPECIFIC DESCRIPTION

Figure 4:
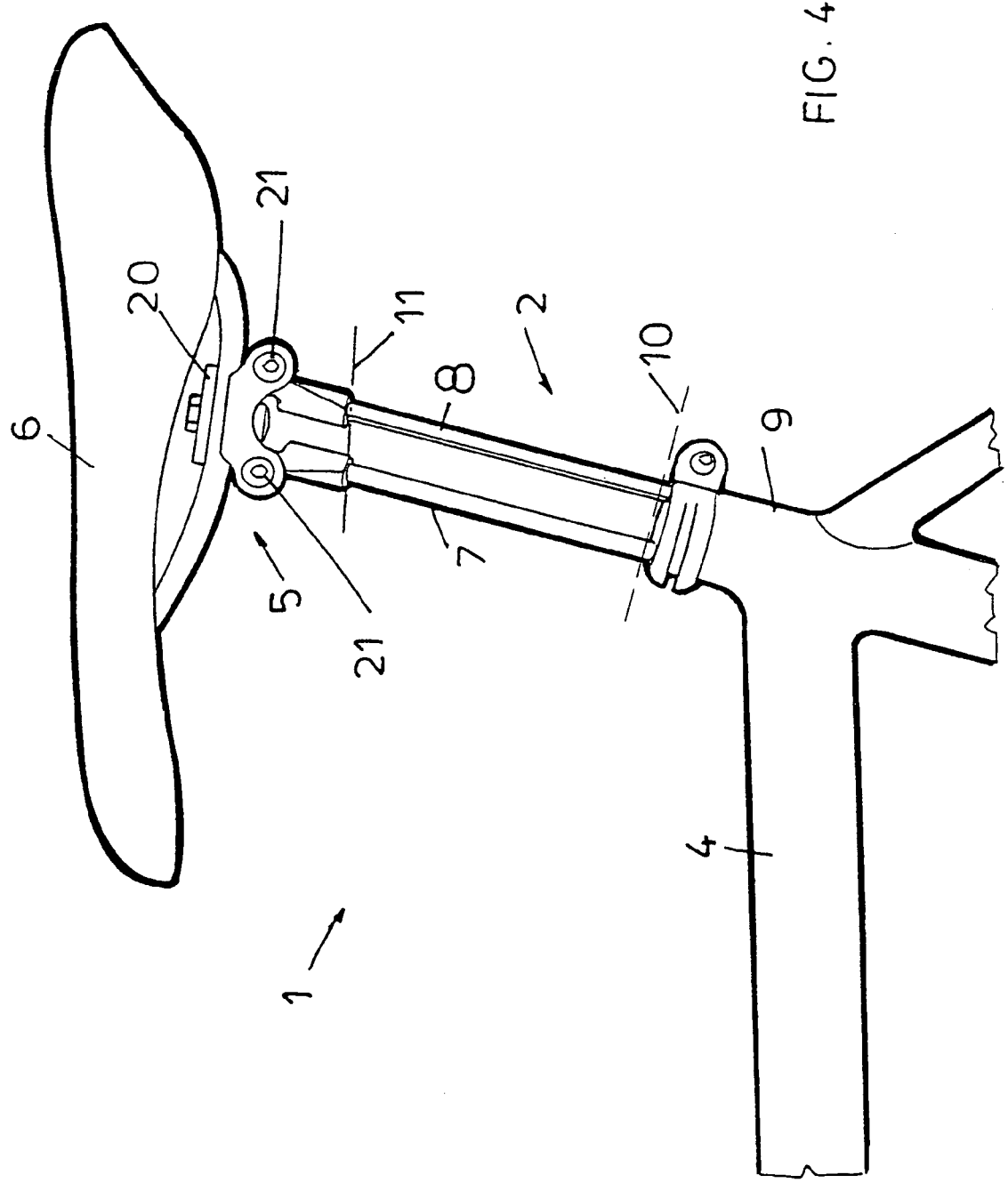
FIG. 4 is a side elevational view of the device connected to a bicycle frame.

The device for absorbing shocks and vibrations, particularly for a bicycle, has been indicated as a whole wholly indicated with reference numeral 1.

The device 1 comprises a shock-absorber element 2 (FIG. 4) with first means 3 (FIG. 1) for connecting to the frame 4 (FIG. 4) of the bicycle and second means 5 for connecting to the saddle 6 thereof.

The shock-absorber element 2 comprises at least one first or front and one second or rear rod-shaped element 7, 8 (FIG. 1) which have the first ends facing towards the frame 4 rigidly fixed to the first connection means 3 to lock them inside the saddle post 9 (FIG. 2) of the frame, and the second ends facing the saddle 6 (FIG. 4) rotatably hinged with said second connection means 5.

Advantageously, moreover, the first and second rod-shaped elements 7, 8 are tilted with respect to the vertical.

In this way the rods are subjected to bending stress in one direction by loads which are substantially vertical (due, for example, to the weight of the user of the bicycle) so as to absorb the shocks and vibrations which occur during the use for the bicycle.

In particular, as shown in the attached figure, the first ends lie on a plant 10 (FIG. 4) substantially tilted and perpendicular to the axis of the post 9 and the second ends lie on a plane 11 which is substantially horizontal and tilted with respect to the axis of the post 9 and parallel to the seating surface of the saddle 6.

Preferably, the second rod-shaped element 8 extends between the first connection means 3 and the second connection means 5 for a greater length with respect to the second rod-shaped element 7.

In this way, the saddle preferably undergoes a displacement towards the rear part of the bicycle remaining substantially parallel to itself and, moreover, moving away from the axis of the post but keeping the distance from the center of the central movement of the bicycle unchanged.

Advantageously, the first and second rod-shaped elements 7, 8 are made from composite material and have a predetermined degree of flexibility which are equal to each other.

In particular, the first and second rod-shaped element 7, 8 are made from resin and organic and/or inorganic fiber.

In particular, the fiber can, for example, be carbon fiber and/or glass fiber and/or natural fiber and/or basalt fiber and/or aramidic fiber.

Advantageously, the resin is a thermoplastic resin and the first and second rod-shaped elements 7, 8 are realized through the pultrusion process.

Moreover, as shown in the attached figures, the first and second rod-shaped elements 7, 8 have a configuration with in section a flat face 12 and a semicircular face 13. The result is a cross section in the form of a circular segment with a minor axis perpendicular to the flat face and a major axis along the flat face. The minor axes lie in a plane containing the longitudinal axis of the bicycle. The first connection means 3 comprises a quadrangular plate 15 having its side surfaces 16 with a curvilinear extension suitable for fitting with the semicircular faces 13 of the first and second rod-shaped elements 7, 8 to create with them a surface with a configuration matching that inside the post 9.

The plate 15 has a different length to vary the degree of flexibility of the first and second rod-shaped elements 7, 8. Moreover, the displacement of the plate 15 allows the degree of elasticity of the rod-shaped elements and, consequently, the amount of shock-absorbency which one wishes to have to be varied.

Preferably, moreover, the plate 15 has weight-reducing holes 17 and side notches 18 to be positioned at corresponding notches 19 present at least on the first and second rod-shaped element 7, 8.

Such notches 18, 19 indicate the degree of flexibility according to the height and weight of the cyclist.

The second means 5 has first attachment members 20 to the saddle 6 and second attachment members 21 suitable for allowing rotate-translation or pivoting of the saddle 6 during the flexing of the first and second rod-shaped element 7, 8.

The present invention also comprises a method for absorbing shocks and vibrations, particularly for a bicycle.

The procedure consists of rotate-translating the saddle of the bicycle by flexing of its support during the shock and/or vibration acting upon the frame keeping the saddle parallel but set back with respect to its rest position, so as to keep its distance from the pedals of the bicycle substantially unchanged.

In practice, it has been noted how the device and procedure for absorbing shocks or vibrations particularly for a bicycle according to the invention are particularly advantageous, because they are particularly compact and light and, moreover, since they allow the saddle to be moved parallel to itself following shocks or vibrations, keeping the distance of the saddle from the pedals of the bicycle substantially unchanged.

Moreover, it should also be specified that the first and second rod-shaped elements can have a curvilinear extension. This eases the flexing of the two elements and the search for a comfortable position of the saddle.

Indeed, it is possible to adjust the inclination of the saddle to suit preference without the presence of further members, but just making one rod-shaped element slide with respect to the other.

Between the first and second rod-shaped element there can also be an elastomeric core which cooperates to optimize the amount of flexing.

The device and procedure for absorbing shocks or vibrations particularly for a bicycle thus conceived are susceptible to numerous modifications and variants, all covered by the inventive concept. Moreover, all of the details can be replaced by technically equivalent elements.

In practice, the materials used, as well as the sizes, can be whatever according to requirements and the state of the art.

The invention claimed is:

1. A device for absorbing shocks and vibrations in a bicycle having a seat post, said device comprising:
   a rearwardly inclined elongated flexible front rod-shaped element of circularly segmental cross section with a rounded surface turned forwardly and a planar surface turned rearwardly, said front rod-shaped element having a lower end received in said post;
   a rearwardly inclined elongated flexible rear rod-shaped element of circularly segmental cross section with a rounded surface turned rearwardly and a planar surface turned forwardly, said rear rod-shaped element having a lower end received in said post;
   a front attachment member at an upper end of said front rod-shaped element;
   a rear attachment member at an upper end of said rear rod-shaped element, said rear rod-shaped element having a greater length between said post and said rear attachment member than the length of said front rod-shaped element between said post and said front attachment member, said front and rear rod-shaped elements being composed of composite material and having the same degree of flex;
   a bicycle seat pivotally connected to said attachment members so as to remain parallel to itself with back and forth flexing of said rod-shaped elements to absorb shocks and vibration by said flexing; and
   a plate received in said post between said planar surfaces of said rod-shaped elements and is formed with weight-reducing holes and side notches adapted to be positioned at corresponding notches on at least one of said rod-shaped elements, the notches indicating a degree of flexibility of the device according to a height and weight of a cyclist.

2. The device defined in claim 1 wherein said front and rear rod-shaped elements are composed of a resin and organic or inorganic fiber embedded in said resin.

3. The device defined in claim 1 wherein said front and rear rod-shaped elements are made from resin and fiber glass or carbon fiber or fiberglass and carbon fiber.

4. The device defined in claim 3 wherein said resin is a thermoplastic resin.

* * * * *